United States Patent
Fukumoto

(10) Patent No.: US 6,753,951 B2
(45) Date of Patent: Jun. 22, 2004

(54) FOCUSING TYPE DISTANCE MEASUREMENT APPARATUS

(75) Inventor: Satoshi Fukumoto, Yokohama (JP)

(73) Assignees: Nikon Trimble Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 10/211,576

(22) Filed: Aug. 5, 2002

(65) Prior Publication Data

US 2003/0086072 A1 May 8, 2003

(30) Foreign Application Priority Data

Aug. 6, 2001 (JP) ........................................ 2001-237662

(51) Int. Cl.⁷ ................................................. G01C 3/08
(52) U.S. Cl. ..................................... 356/4.01; 356/5.01
(58) Field of Search ........................ 356/4.01, 5.01–5.15

(56) References Cited

U.S. PATENT DOCUMENTS 5,880,822 A * 3/1999 Kubo .......................... 356/5.1
6,384,904 B1 5/2002 Ohishi et al.

FOREIGN PATENT DOCUMENTS

| JP | A 9-152333 | 6/1997 |
| JP | A 11-109022 | 4/1999 |
| JP | A 2000-329517 | 11/2000 |
| JP | A 2001-208845 | 8/2001 |

* cited by examiner

Primary Examiner—Stephen C. Buczinski
(74) Attorney, Agent, or Firm—Oliff & Berridge PLC

(57) ABSTRACT

By providing a diffusing plate between a laser diode and an objective lens, a measurement light flux emitted from the laser diode is irradiated on a corner cube in a defocused state via the objective lens. The light flux having been reflected at corner cube sustains the defocused state. The reflected light flux having been reflected at and having exited the corner cube becomes condensed onto an avalanche photodiode through the objective lens. Even when a vibration occurs at the corner cube, the reflected light flux is received at the avalanche photodiode as long as the light flux having been reflected at and having exited the corner cube is within the predetermined range.

4 Claims, 11 Drawing Sheets

FOCUSING TYPE DISTANCE MEASUREMENT APPARATUS

INCORPORATION BY REFERENCE

The disclosure of the following priority application is incorporated herein by reference: Japanese Patent Application No. 2001-237662 filed Aug. 6, 2001

BACKGROUND OF THE INVENTION

1. Field of the Invention

The present invention relates to a focusing type distance measurement apparatus that measures the distance to a target object by transmitting light so as to focus the light at the target object and then receiving the light reflected or scattered from the target object.

2. Description of the Related Art

There are apparatuses that measure distances by using light waves in the related art. In a distance measurement achieved by using light waves, the distance to a target object is determined by transmitting modulated light toward the target object, receiving the light reflected from the target object and detecting the difference between the phases of the modulation signals corresponding to the transmitted light and the received light. A distance measurement apparatus adopting this measurement method may measure the distance to a corner cube (prism) used as the target object by transmitting modulated light toward the corner cube and receiving the light reflected from the corner cube or it may instead measure the distance to the target object which is not a corner cube by causing modulated light to scatter at the surface of the target object and receiving the scattered light. An apparatus that measures distances without using a corner cube is referred to as a non-prism type distance measurement apparatus. When light scattered at the target object is received, the light quantity of the received light flux is very much smaller than the light quantity of the received light flux of the light reflected at a corner cube (approximately 1/1 million). For this reason, a focusing type distance measurement apparatus adopts a configuration that allows measurement light (modulated light) to exit an objective lens toward the target object so as to condense the measurement light flux onto the target object and also allows the scattered light from the target object to be condensed on a light-receiving element via the objective lens, to ensure that a sufficient quantity of light is received. There is a demand for this type of focusing type distance measurement apparatus that also allows the use of a corner cube as the target object.

If the position of the corner cube used as the target object becomes offset or the corner cube vibrates, a collimation position of the focusing type distance measurement apparatus becomes offset from the center of the corner cube. If the measurement light flux enters the corner cube at a position offset from the center, the reflected light exits the corner cube from the position symmetrical to the point of entry at which the measurement light flux entered, relative to the center of the corner cube. This reflected light is transmitted through the objective lens as a light flux originating from a position off the collimation position of the focusing type distance measurement apparatus, i.e., off the optical axis, and forms an image at a position off the optical axis. Since the light-receiving element is normally provided on the optical axis, the quantity of light entering the light-receiving element changes as the corner cube vibrates, causing difficulty in achieving an accurate distance measurement. Such a vibration of the corner cube is particularly problematic in a short distance measurement, i.e., when the distance to the target object is small.

SUMMARY OF THE INVENTION

An object of the present invention is to provide a focusing type distance measurement apparatus that facilitates measurement of a short distance (several tens of meters or less) performed by using a corner cube.

A focusing type distance measurement apparatus according to a first aspect of the present invention comprises a collimating optical system that collimates the light from a target object, a light-transmitting optical system that transmits a measurement light flux to the target object, a focusing optical system that condenses the measurement light flux onto the target object, a light-receiving optical system that receives a reflected light flux reflected from the target object via the focusing optical system and a deflecting optical member that changes the state in which the measurement light flux is condensed on the target object.

The focusing type distance measurement apparatus in the first aspect of the present invention may further include an operating member that outputs an operation signal for performing distance measurement by using a prism as the target object and a control circuit that implements control on the deflecting optical member to achieve a first state at the deflecting optical member so as to change the state in which the measurement light flux is condensed when the following conditions are present; the operation signal has been output through the operating member and the light reception level indicating the quantity of the reflected light flux received at the light-receiving optical system is equal to or lower than a predetermined value or the light reception level manifests a significant change and implements control on the reflecting optical member to achieve a second state so as not to change the state in which the measurement light flux is condensed when the conditions are not present.

A focusing type distance measurement apparatus in a second aspect of the present invention, achieved by replacing the deflecting optical member that changes the state in which the measurement light flux is condensed on the target object with a deflecting light optical member that changes the state in which the reflected light flux received at the light-receiving optical system is condensed, further includes an operating member that outputs an operation signal for performing distance measurement by using a prism as the target object and a control circuit that implements control on the deflecting optical member achieve a first state so as to change the state in which the measurement light flux is condensed when the following conditions are present; the operation signal has been output through the operating member and the light reception level indicating the quantity of the reflected light flux received at the light-receiving optical system is equal to or lower than a predetermined value or the light reception level manifests a significant change and implements control on the deflecting optical member to achieve a second state so as not to change the state in which the measurement light flux is condensed when the conditions are not present.

A focusing type distance measurement apparatus in a third aspect of the present invention, achieved by replacing the deflecting optical member that changes the state in which the measurement light flux is condensed on the target object with a deflecting optical member that changes the state in which a reflected light flux received at the light-receiving optical system is condensed, further includes a control circuit that implements control on the deflecting optical member so as not to change the state in which the reflected light flux is condensed if the light reception level indicating the quantity of the reflected light flux received at the light-receiving optical system exceeds a predetermined value.

A focusing type distance measurement apparatus in a fourth aspect of the present invention, achieved by replacing the deflecting optical member that changes the state in which the measurement light flux is condensed on the target object with a deflecting optical member that changes the state in which a reflected light flux received at the light-receiving optical system is condensed, further includes an operating member that outputs an operation signal for performing a short distance measurement by using a prism as the target object and a control circuit that implements control on the deflecting optical member to achieve a first state so as to change the state in which the measurement light flux is condensed when the operation signal has been output through the operating member and implements control on the deflecting optical member to achieve a second state so as not to change the state in which the measurement of light flux is condensed when the operation signal has not been output.

A focusing type distance measurement apparatus in a fifth aspect of the present invention comprises a collimating optical system that collimates the light from a target object, a light-transmitting optical system that transmits a measurement light flux to the target object, a focusing optical system that condenses the measurement light flux onto the target object, a light-receiving optical system that receives a reflected light flux reflected from the target object via the focusing optical system, an internal light path through which the light flux transmitted from a light source at the light-transmitting optical system is guided to a light-receiving unit in the light-receiving optical system within the measurement apparatus instead of allowing the light flux to be transmitted toward the target object, an external light path through which the measurement light flux transmitted from the light-transmitting optical system is guided to the target object and the reflected light flux reflected from the target object is guided to the light-receiving optical system and a switching shutter that selects either the internal light path or the external light path for the light flux transmitted from the light source to be guided through, with a deflecting optical member that changes the state in which the measurement light flux is condensed on the target object provided at the switching shutter.

The focusing type distance measurement apparatus in the fifth aspect of the present invention may further include a first operating member that outputs an operation signal to enable distance measurement by using a prism as the target object and a control circuit that implements control on the switching shutter so as to change the state in which the measurement light flux is condensed when the operation signal has been output through the first operating member and the light reception level indicating the quantity of the reflected light flux received at the light-receiving optical system is equal to or lower than a predetermined value or the light reception level manifests a significant change.

Alternatively, the focusing type distance measurement apparatus in the fifth aspect of the present invention may further include a second operating member that outputs an operation signal for performing a short distance measurement by using a prism as the target object and a control circuit that implements control on the switching shutter so as to change the state in which the measurement light flux is condensed when the operation signal has been output from the second operating member.

In the focusing type distance measurement apparatuses described above, a light attenuator that adjusts the light reception level of the light received at the light-receiving optical system may be provided at the deflecting optical member. It is desirable to adjust the light reception level through the light attenuator when the deflecting optical member is in the second state. Such a deflecting optical member may include a plurality of light transmittance adjustment areas provided along the circumference of a rotating plate and a diffusion area where the light flux is diffused provided along the direction in which the plurality of light transmittance adjustment areas are arranged. In this case, the control circuit may include a motor in order to rotate the rotating plate. In addition, the control circuit inserts the diffusion area at a measurement light path when the deflecting optical member is in the first state and inserts one of the plurality of light transmittance adjustment areas in the measurement light path when the deflecting optical member is in the second state.

The deflecting optical member in a focusing type distance measurement apparatus according to the present invention may be constituted of an optical member that achieves a diffusing function or an optical member that achieves a refracting function.

DESCRIPTION OF THE PREFERRED EMBODIMENTS

The following is an explanation of the embodiments of the present invention, given in reference to the drawings.

First Embodiment

Figure 1:
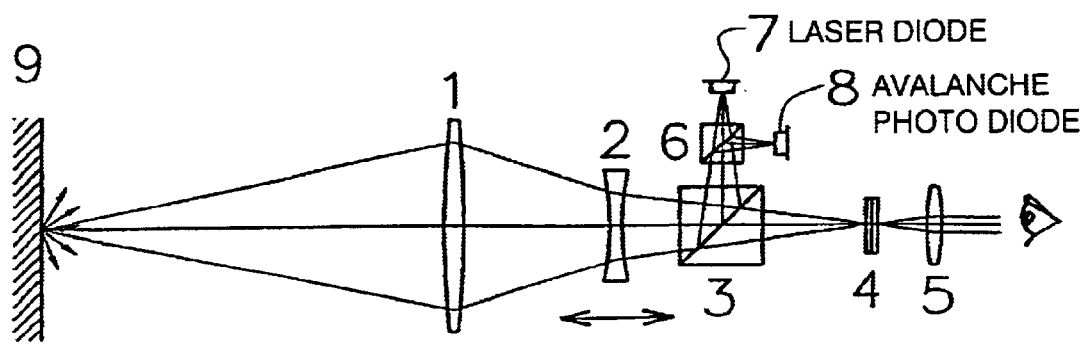
FIG. 1 illustrates the basic configuration of the optical systems in a focusing type distance measurement apparatus.

FIG. 1 illustrates the basic configuration of the optical systems in a focusing type distance measurement apparatus. In FIG. 1, a pulse current is supplied from a drive circuit (not shown) to an LD (laser diode) 7 and, as a result, the LD 7 emits pulse-modulated measurement light. The pulse light emitted from the LD 7 enters a dichroic prism 3 via a splitting prism 6. The dichroic prism 3 achieves characteristics whereby it reflects infrared light from the LD 7 and allows light having a wave length in the visible light range to be transmitted. The pulse light having entered the dichroic prism 3 is reflected inside the dichroic prism 3 and is then emitted toward a target object 9 via a focusing lens 2 and an objective lens 1.

The reflected light (scattered light) from the target object 9 attributable to the measurement light from the LD 7 enters the dichroic prism 3 via the objective lens 1 and the focusing lens 2. The scattered light having entered the dichroic prism 3 is reflected inside the dichroic prism 3, and then enters an APD (avalanche photodiode) 8 via the splitting prism 6. The reflected light (scattered light) from the target object 9 attributable to the illuminating light (e.g., natural light) irradiating the target object 9, on the other hand, enters the dichroic prism 3 via the objective lens 1 and the focusing lens 2, and its visible light component passes through the dichroic prism 3 to form an image of the target object 9 at a focusing plate 4. The image of the target object 9 formed on the focusing plate 4 is observed by the user through an eyepiece lens 5.

In FIG. 1, the LD 7, the APD 8 and the focusing plate 4 are set at optically conjugate positions. Thus, when the focusing lens 2 is driven along the optical axis in the horizontal direction in FIG. 1 so that the focal point of the focusing lens 2 is on the target object 9, the measurement light flux is condensed on the target object 9. At this time, the reflected light (scattered light) from the target object 9, too, is condensed at the APD 8. By adopting the configuration described above, the light-transmitting optical system, the light-receiving optical system and the collimating optical system of the focusing type distance measurement apparatus are achieved.

Figure 2:
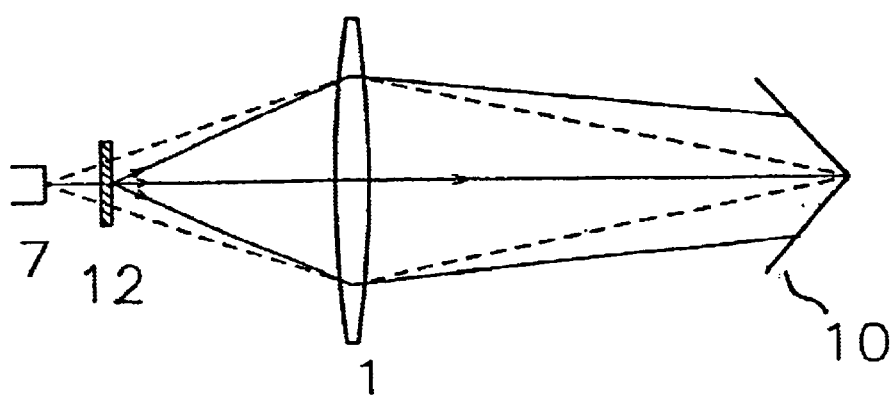
FIG. 2 illustrates the light-transmitting optical system in the focusing type distance measurement apparatus achieved in a first embodiment.

FIG. 2 illustrates the light-transmitting optical system in the focusing type distance measurement apparatus achieved in the first embodiment of the present invention. A corner cube 10 is used as the target object of the distance measurement. The corner cube 10 is constituted of a prism that includes reflecting surfaces perpendicular to each other as shown in the figure and radiates reflected light parallel to the incident light. FIG. 2 does not include the illustration of the focusing lens, the splitting prism, the dichroic prism, the collimating optical system (the focusing plate and the eyepiece lens) and the like. A deflecting plate 12 achieving a diffusing function is provided between the LD 7 and the objective lens 1. If there is no deflecting plate 12, the measurement light flux emitted from the LD 7 will be condensed at the center of the corner cube 10, i.e., the target object, as indicated with the dotted line in FIG. 2. However, since the deflecting plate 12 is provided in reality, the measurement light flux exiting the deflecting plate 12 advances toward the corner cube 10 from a new light source position, i.e., from the deflecting plate 12, as indicated with the solid line in FIG. 2, to be irradiated onto the corner cube 10 as a broader light flux. In other words, the measurement light flux becomes defocused on the corner cube 10.

Figure 3:
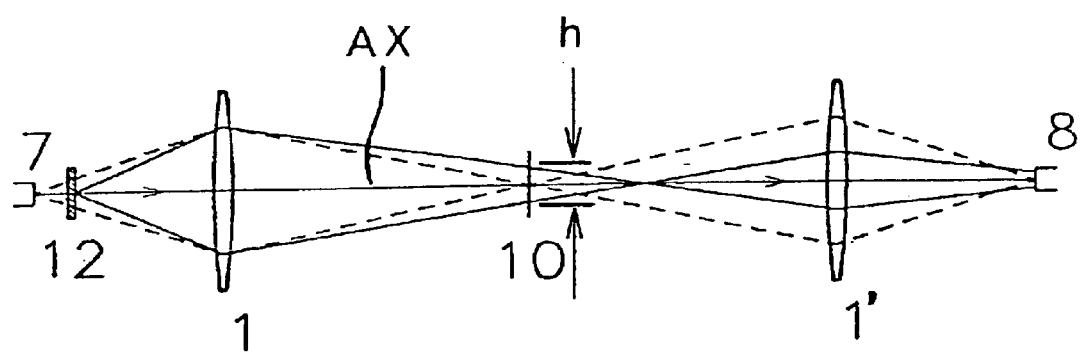
FIG. 3 shows the optical systems including the light-receiving optical system.

FIG. 3 shows the optical systems including the light receiving optical system which receives the reflected light resulting from the light cast by the light-transmitting optical system shown in FIG. 2. While the actual reflected light is turned back at the surface of the corner cube 10, the reflected light shown in FIG. 3 is not turned back for purposes of simplicity. In other words, objective lenses 1 and 1' are a single lens in reality.

In FIG. 3, the measurement light flux emitted from the LD 7 is irradiated in a defocused state onto the corner cube 10 via the objective lens 1 as indicated with the solid line. Since the corner cube 10 constitutes the target object, the defocused state of the measurement light flux is sustained after the measurement light flux is reflected, and the defocused reflected light flux exits the corner cube 10. This reflected light flux is condensed on the APD 8 by the objective lens 1'. It is to be noted that the position of the focusing lens which is not shown in FIG. 3 is adjusted at the position at which a focal point of the collimating optical system is on the target object.

Due to the presence of the deflecting plate 12, the light transmitting optical system and the light-receiving optical system are no longer conjugate with each other and, as a result, the reflected light flux (the received light flux) is not focused at the light-receiving surface of the APD 8. However, since the APD 8 only needs to output a photocurrent corresponding to the quantity of light entering its light-receiving surface, it does not matter if the image is not focused at the light-receiving surface as long as the reflected light flux at least enters the light-receiving surface. FIG. 3 shows that the reflected light can be received at the APD 8 as long as the reflected light flux exiting the corner cube 10 is within the range h. The embodiment of the present invention is characterized in that when the corner cube 10 is used as the target object in the distance measurement, the deflecting plate 12 is inserted between the LD 7 and the objective lens 1 to allow the reflected light flux to enter the APD 8 with ease.

A structure which does not include the deflecting plate 12 is now explained in reference to FIG. 3. The measurement light flux emitted from the LD 7 is irradiated via the objective lens 1 to achieve a focused state at the center of the corner cube 10 as indicated with the dotted line. The reflected light flux advances toward the objective lens 1' from the new light source position, i.e., from the center of the corner cube 10, and forms an image on the APD 8 through the objective lens 1'. In this case, the reflected light flux is received at the APD 8 only if the center of the corner cube 10 is on the optical axis AX or if the center of the corner cube 10 is in close proximity to the optical axis AX. Namely, in the case of the light flux indicated with the dotted line in FIG. 3, the reflected light flux cannot be readily condensed on the APD 8 once the center of the corner cube 10 becomes offset from the optical axis AX.

Figure 4:
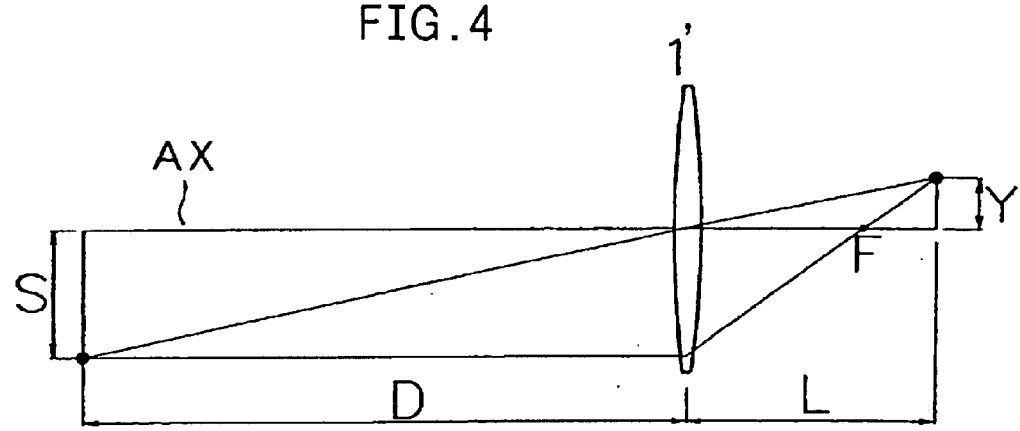
FIG. 4 illustrates the misalignment of the corner cube center relative to the optical axis and the misalignment of the received light flux relative to the optical axis, manifesting when a parallel light flux enters the objective lens.

FIG. 4 illustrates the misalignment of the center of the corner cube 10 from the optical axis AX and the misalignment of the received light flux from the optical axis AX, manifesting when the parallel light flux enters the objective lens 1'. In FIG. 4, D represents the distance from the corner cube 10 to the objective lens 1', L represents the distance from the objective lens 1' to the position at which a focused image is formed with the received light flux (reflected light flux), S represents the distance (the shift quantity) between the optical axis AX and the position at which the focused image is formed with the reflected light flux, attributable to the collimation shift of the corner cube 10 and Y represents the distance between the optical axis AX and the position at which the focused image is formed with the received light flux. These distances achieve a relationship expressed as in (1) below.

$$Y = (S \times L)/D \qquad (1)$$

When L=200 mm and S=10 mm with regard to the optical systems in the distance measurement apparatus, the distance Y between the optical axis AX and the position at which the focused image is formed with the received light flux increases as indicated below in reverse proportion to the change in the distance D as the distance D between the corner cube 10 and the objective lens 1' is reduced.

| D | L | S | Y |
|---|---|---|---|
| 20 m | 200 mm | 10 mm | 0.1 mm |
| 10 m | 200 mm | 10 mm | 0.2 mm |
| 5 m | 200 mm | 10 mm | 0.4 mm |
| 2 m | 200 mm | 10 mm | 1.0 mm |

The numerical values above indicate that when the distance D from the corner cube 10 to the objective lens 1' is equal to or less than 20 m, the distance Y between the optical axis AX and the position at which the focused image is formed with the received light flux is equal to or greater than 0.1 mm. The area over which light is received at the APD 8 is normally within the range of several tens of $\mu m\phi \sim 0.2$ mm$\phi$. Thus, if the incident light flux becomes offset from the optical axis AX and Y becomes equal to or greater than 0.1 mm, the received light flux no longer enters the light-receiving surface of the APD 8 set on the optical axis AX. In such a situation, the deflecting plate 12 is inserted between the LD 7 and the objective lens 1 and the defocused measurement light flux is caused to enter the corner cube 10 so as to allow the reflected light flux to enter the APD 8. It is to be noted that when the optical systems assume the numerical values indicated above, the distance Y from the optical axis AX to the position at which the focused image is formed with the received light flux is equal to or less than 0.1 mm if the distance D is equal to or greater than 20 m and, in such a case, it is not necessary to insert the deflecting plate 12.

In the focusing type distance measurement apparatus, the quantity of light received at the APD 8 is significantly affected by factors such as the distance D to the target object, the material constituting the target object and the type of surface treatment that the target object has undergone. Accordingly, a light variable attenuator is provided so as to adjust the quantity of light entering the APD 8 at a constant level. This light variable attenuator may be constituted by, for instance, an ND filter or the like which is rotatably inserted in a light path to achieve a gradual change in the concentration of light. The light path at which the light variable attenuator is inserted is located between the LD 7 and the objective lens 1.

Figure 5:
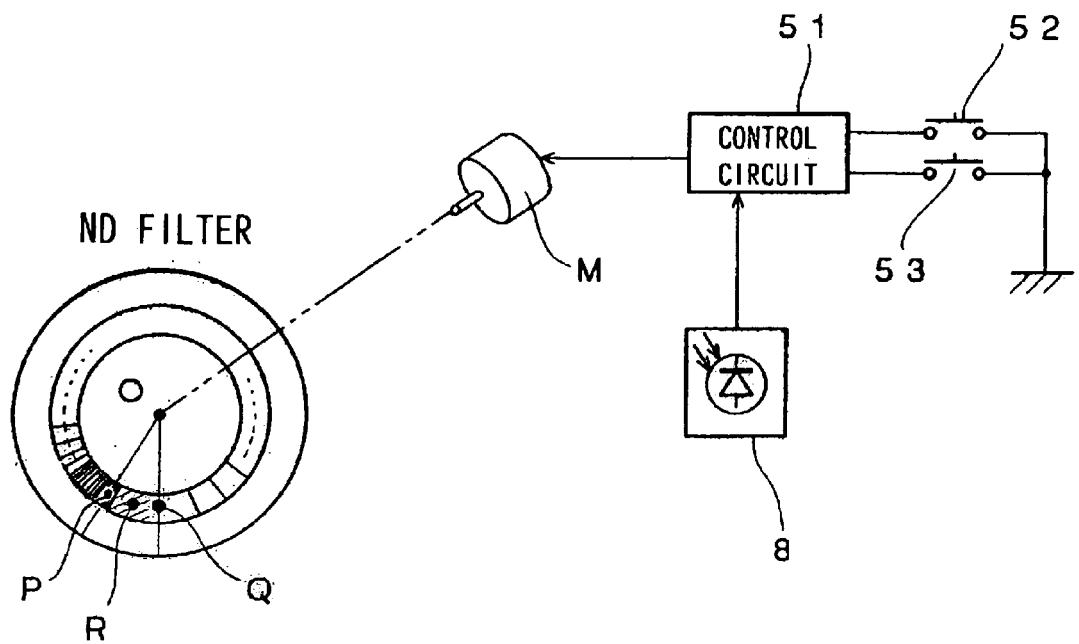
FIG. 5 illustrates the ND filter.

FIG. 5 illustrates an ND filter. The ND filter is constituted by forming a band of varying concentration from a point P to a point Q around a film formed in a round shape having a center O. The concentration over the area corresponding to the point P is the highest, the concentration gradually becomes lower along the clockwise direction and the concentration over the area corresponding to the point Q is the lowest. A diffusing plate is pasted over the area corresponding to the point R. The ND filter is driven by a motor M to rotate around the center O. As a result, the concentration of the portion inserted in the light path changes to adjust the degree to which the light is attenuated. The state in which the diffusing plate is left inserted in the light path as the motor M comes to a halt is equivalent to a state in which the deflecting plate 12 described above is set in place.

The motor M may be, for instance, a stepping motor, and its rotating angle is controlled in conformance to a drive pulse signal provided by a control circuit 51. The control circuit 51 calculates the necessary attenuation quantity based upon the photocurrent output from the APD 8, and generates a pulse signal for rotating the motor M so as to insert the portion of the ND filter with the correct concentration for achieving the attenuation quantity into the light path. When the deflecting plate 12 is required, the control circuit 51 generates a pulse signal for rotating the motor M so as to insert the deflecting plate 12 into the light path.

Operation signals are individually input to the control circuit 51 through a corner cube in-use button 52 and a corner cube not-in-use button 53. If an operation signal is input through the corner cube in-use button 52, the control circuit 51 judges that a prism mode is currently selected, whereas if an operation signal is input through the corner cube not-in-use button 53, the control circuit 51 judges that a non-prism mode is currently selected. The prism mode is an operating mode in which the distance is measured by using a corner cube as the target object, and the non-prism mode is an operating mode in which distance is measured without using the corner cube.

Figure 6:
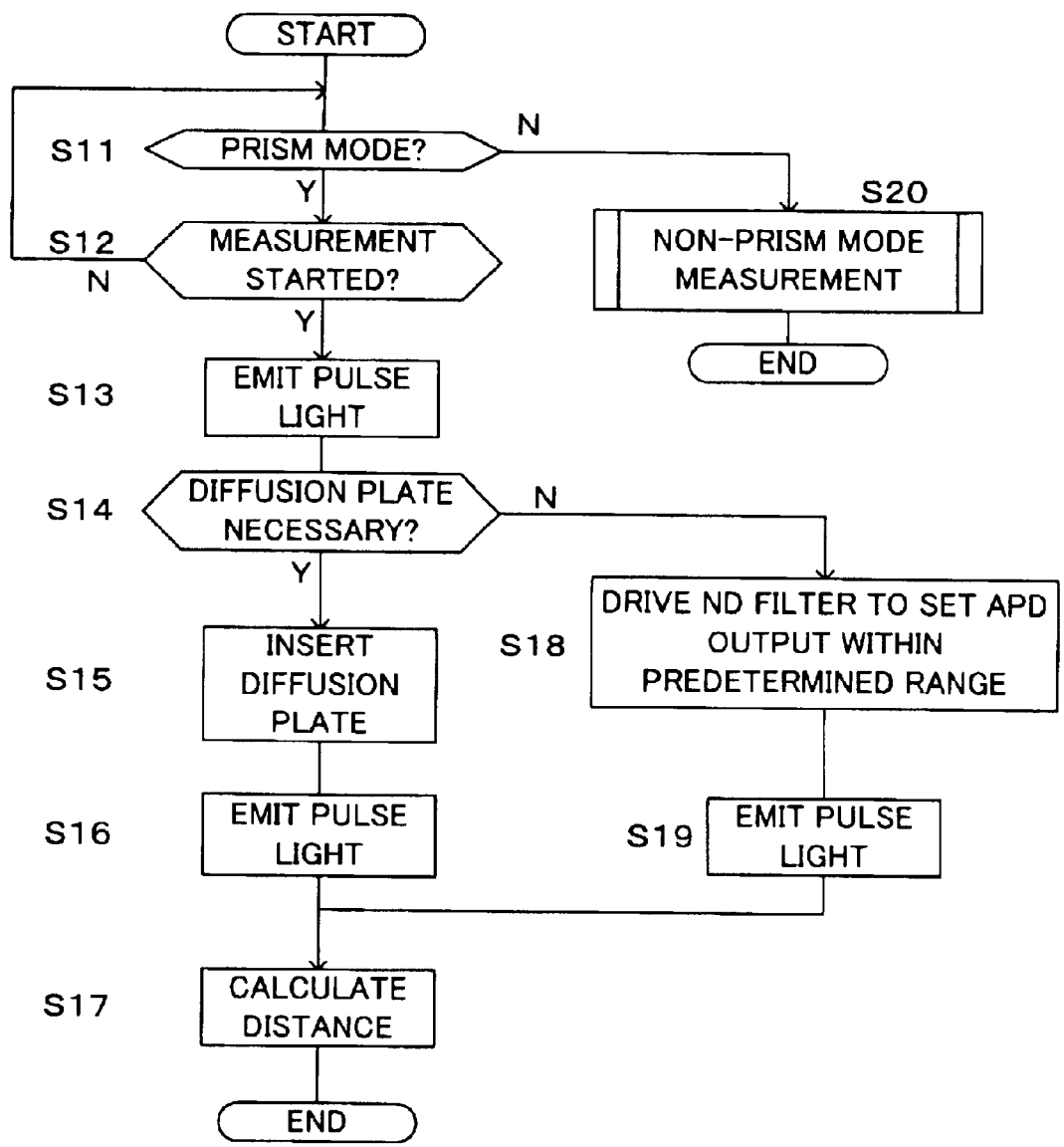
FIG. 6 presents a flowchart of the distance measurement processing executed by the control circuit.

The distance measurement processing executed by the control circuit 51 of the focusing type distance measurement apparatus described above is now explained in reference to the flowchart presented in FIG. 6. In the first embodiment, the deflecting plate 12 is inserted between the LD 7 and the objective lens 1 as necessary while the focusing type distance measurement apparatus is set in the prism mode. In step S11, the control circuit 51 makes a decision as to whether or not the prism mode is currently selected. If the distance measurement apparatus is set in the prism mode, an affirmative decision is made in step S11 and the operation proceeds to step S12, whereas if the distance measurement apparatus is not set in the prism mode, a negative decision is made in step S11 and the operation proceeds to step S20.

In step S12, the control circuit 51 makes a decision as to whether or not a measurement has been started. An affirmative decision is made in step S12 if an operation signal has been input through a start button (not shown) and in this case, the operation proceeds to step S13, whereas a negative decision is made in step S12 if no operation signal has been input through the start button and the operation returns to step S11. In step S13, the control circuit 51 outputs a command for the LD 7 to engage in a pulse light emission before the operation proceeds to step S14.

In step S14, the control circuit 51 makes a decision as to whether or not it is necessary to insert the deflecting plate 12. The control circuit 51 makes an affirmative decision in step S14 if the value of the photocurrent output by the APD 8 is smaller than a predetermined value or the value of the photocurrent manifests a significant change (e.g., a change by a factor of 1000 or greater), and then the operation proceeds to step S15. If the value of the photocurrent is smaller than the predetermined value, the light reception level is low. If, on the other hand, the value of the photocurrent is equal to or greater than the predetermined value and the photocurrent value does not show a significant change, a negative decision is made in step S14 and the operation proceeds to step S18. A significant change in the photocurrent value is caused when the corner cube 10 vibrates to become offset from the collimation position and thus the reflected light flux fails to be condensed on the APD 8 so that the light reception level changes significantly.

In step S15, the control circuit 51 outputs a pulse signal for rotating the motor M so as to insert the deflecting plate 12 within the light path, before the operation proceeds to step S16. In step S16, the control circuit 51 outputs a command for the LD 7 to engage in a pulse light emission, before the operation proceeds to step S17. In step S17, the control circuit 51 calculates the distance to the target object based upon the difference between the phase of the timing of the transmitted pulse light and the phase of the timing of the photocurrent output from the APD 8, and then the processing in FIG. 6 ends.

Instep S18 to which the operation proceeds after making a negative decision in step S14, the control circuit 51 calculates the attenuation quantity so as to set the value of the photocurrent output from the APD 8 within a predetermined range and outputs a pulse signal for achieving the calculated attenuation quantity to the motor M before the operation proceeds to step S19. In step S19, the control circuit 51 outputs a command for the LD 7 to engage in a pulse light emission, and then the operation proceeds to step S17.

In step S20, to which the operation proceeds if the distance measurement apparatus is not set in the prism mode, the control circuit 51 implements non-prism mode measurement processing in the known art before ending the processing in FIG. 6.

The level of the scattered light scattered at the surface of the target object 9 is normally as low as 1/1 million of the level of the reflected light from the corner cube 10. For this reason, the light-receiving sensitivity at the light-receiving optical system is set high for the non-prism mode measurement in which the distance is measured by receiving scattered light. If this light-receiving sensitivity setting is sustained during a prism mode measurement in which the distance is measured by receiving the reflected light from the corner cube 10, an excessive quantity of light is received and thus, the signal level becomes too high. Accordingly, by making a negative decision in step S14 to attenuate the received light flux, the quantities of light actually entering the APD 8 in the non-prism mode and in the prism mode are adjusted to levels substantially equal to each other. Since the reflected light flux becomes defocused on the APD 8 while the diffusing plate is inserted, the signal level at the APD 8 does not become too high.

The following advantages are achieved in the first embodiment described above.

(1) When the focusing type distance measurement apparatus, capable of measuring a distance both in the non-prism mode, in which a distance measurement is performed by using a target object 9 other than the corner cube 10, and in the prism mode, in which a distance measurement is executed by using the corner cube 10, is set in the prism mode, the deflecting plate 12 is inserted between the LD 7 that emits the measurement light and the objective lens 1 if the quantity of light received at the APD 8 is smaller than a predetermined value or if the quantity of received light changes significantly (by a factor of at least 1000, for instance). As a result, a defocused measurement light flux enters the corner cube 10 and, consequently, the reflected light flux can be condensed on the APD 8. This feature is particularly advantageous when the distance D between the objective lens 1 and the corner cube 10 is small and there is vibration in the corner cube 10.

(2) If the quantity of light received at the APD 8 is greater than the predetermined value, the concentration at the ND filter inserted in the light path between the LD 7 and the objective lens 1 is changed to ensure that a substantially constant quantity of light is received at the APD 8. Since the photocurrent output from the APD 8 is adjusted to achieve a substantially constant value, the gain at the subsequent stage relative to the APD 8 in the light-receiving circuit does not need to be changed and thus, the same gain can be used even when the scattered light level changes. As a result, a cost reduction is achieved over a structure in which the gain must be variable.

(3) Since the deflecting plate 12 is pasted onto part of the round film constituting the ND filter, it is not necessary to add a special optical system in order to insert the deflecting plate 12 into the light path. Thus, the apparatus can be achieved as a compact unit and can be produced at reduced cost.

While the extent by which the light is attenuated through the ND filter does not change while the deflecting plate 12 is inserted in the light path in the explanation given above, the light attenuation quantity achieved through the filter may change while the deflecting plate 12 is inserted, instead. In the latter case, a plurality of deflecting plates should be individually pasted onto portions with varying concentration formed at the round film so that as a different deflecting plate is inserted in the light path, the attenuation quantity achieved through the filter changes.

In step S14 explained above, a decision is made by the control circuit 51 as to whether or not it is necessary to insert the deflecting plate 12 and the deflecting plate 12 is inserted into the light path if an affirmative decision is made in step S14. Instead, a short distance measurement button (not shown) may be provided in the focusing type distance measurement apparatus. In this focusing type distance measurement apparatus, a decision should be made as to whether or not the short distance measurement button has been operated by the user and the deflecting plate 12 should be inserted within the light path if the short distance measurement button has been operated.

Figure 7:
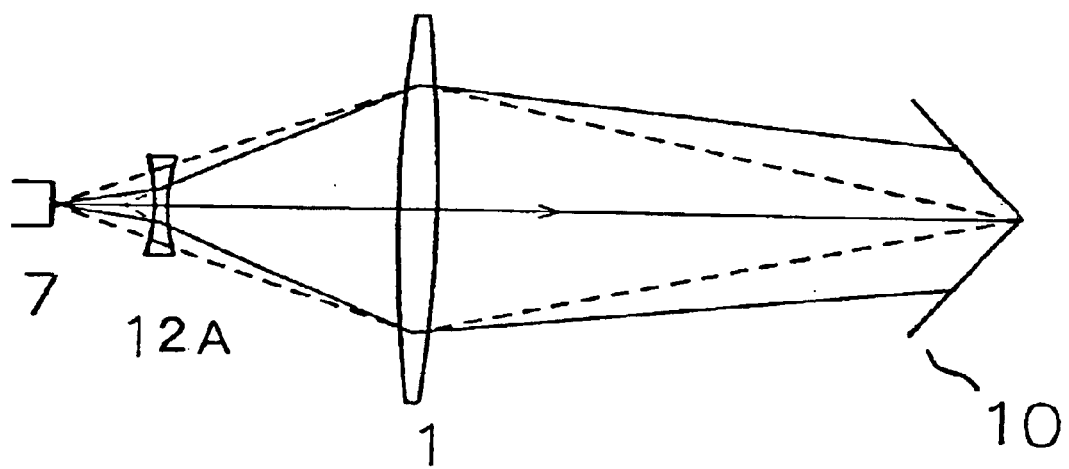
FIG. 7 shows an example of a variation of the light-transmitting optical system.

Instead of the deflecting plate 12 achieving a diffusing function, a deflecting plate achieving a refracting function may be utilized. FIG. 7 shows an example of a variation of the light-transmitting optical system achieved in the first embodiment. The illustration does not include the focusing lens, the splitting prism, the dichroic prism, the collimating optical system (the focusing plate and the eyepiece lens) and the like. In FIG. 7, a deflecting plate 12A constituted of a concave lens achieving a refracting function is provided between the LD 7 and the objective lens 1. A measurement light flux exiting the deflecting plate 12A advances toward the corner cube 10 from a new light source position, i.e., from the deflecting plate 12A, as indicated with the solid line in FIG. 7, and is irradiated onto the corner cube 10 as a broader light flux. Namely, the measurement light flux can achieve a defocused state on the corner cube 10 when a concave lens is utilized as a deflecting plate as well.

Second Embodiment

In the second embodiment, the deflecting plate 12 inserted between the LD 7 and the objective lens 1 is withdrawn as necessary while the focusing type distance measurement apparatus is set in the prism mode. The distance measurement processing executed by the control circuit 51 of the focusing type distance measurement apparatus in the second embodiment is now explained in reference to the flowchart presented in FIG. 8. In step S31, the control circuit 51 makes a decision as to whether or not the prism mode is currently selected. If the prism mode is currently selected, an affirmative decision is made in step S31 and the operation proceeds to step S32, whereas if the prism mode is not currently set, a negative decision is made in step S31 and the operation proceeds to step S40.

In step S32, the control circuit 51 outputs a pulse signal for rotating the motor M so as to insert the deflecting plate 12 into the light path before the operation proceeds to step S33. In step S33, the control circuit 51 makes a decision as to whether or not the measurement has started. An affirmative decision is made in step S33 if an operation signal has been input through the start button (not shown) and in this case, the operation proceeds to step S34, whereas a negative decision is made in step S33 if no operation signal has been input through the start button and the operation returns to step S31.

In step S34, the control circuit 51 outputs a command for the LD 7 to engage in a pulse light emission before the operation proceeds to step S35. In step S35, the control circuit 51 makes a decision as to whether or not it is necessary to withdraw the deflecting plate 12. The control circuit 51 makes an affirmative decision in step S35 if the value of the photocurrent output from the APD 8 is equal to or greater than a predetermined value and the photocurrent value has not changed significantly (e.g., by a factor of 1000 or more) and, in such a case, the operation proceeds to step S36. If, on the other hand, the photocurrent value is smaller than the predetermined value or the photocurrent value has changed significantly, a negative decision is made in step S35 and the operation proceeds to step S39.

In step S36, the control circuit 51 outputs a pulse signal for rotating the motor M so as to withdraw the deflecting plate 12 from the light path and then the operation proceeds to step S 37. In step S37, the control circuit 51 calculates the attenuation quantity so as to set the value of the photocurrent output from the APD 8 within a predetermined range and outputs a pulse signal for achieving the calculated attenuation quantity to the motor M before the operation proceeds to step S38. In step S38, the control circuit 51 outputs a command for the LD 7 to engage in a pulse light emission and then the operation proceeds to step S39.

Figure 8:
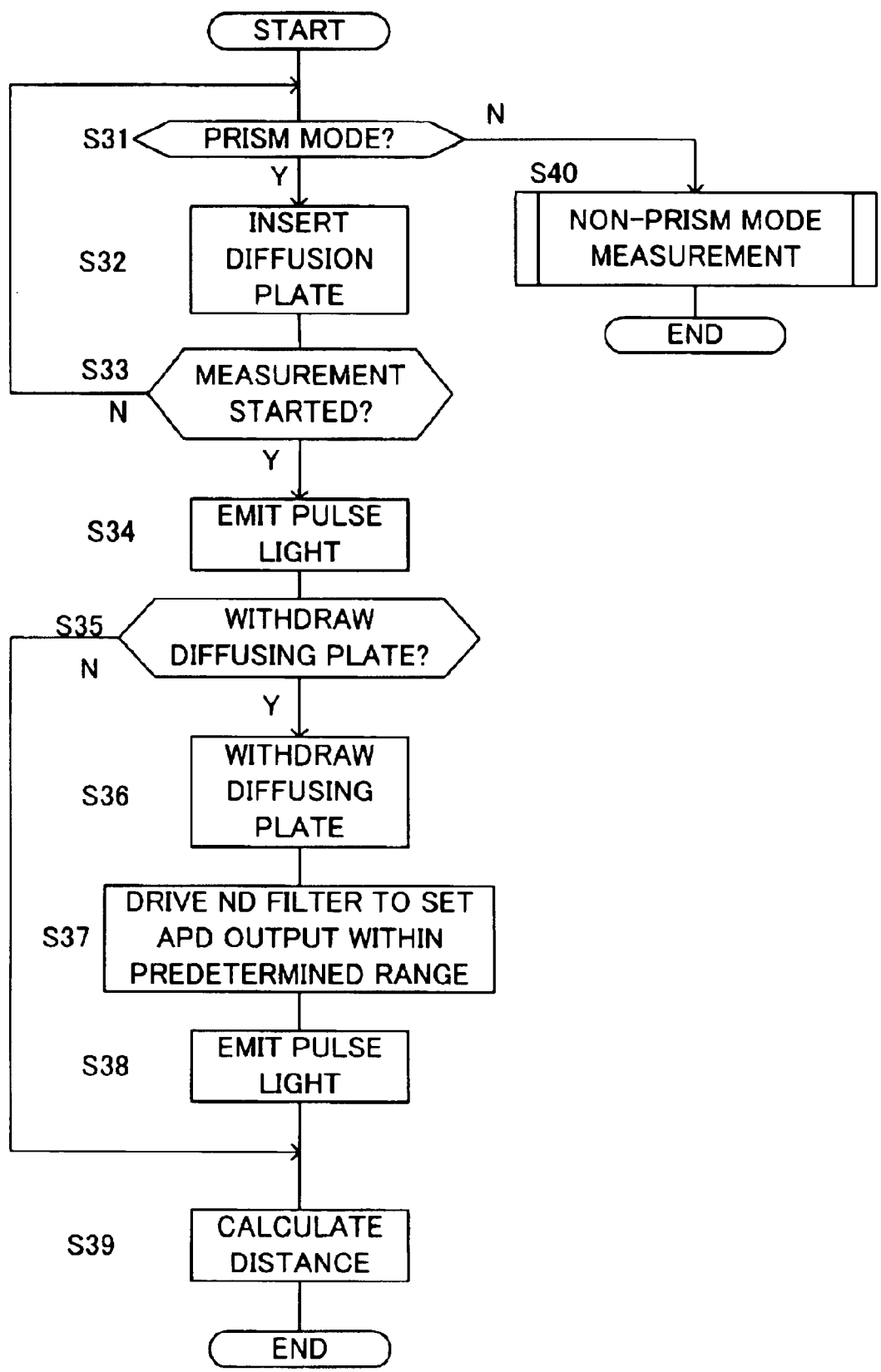
FIG. 8 presents a flowchart of the distance measurement processing executed by the control circuit in a second embodiment.

In step S39, the control circuit 51 calculates the distance to the target object based upon the difference between the phase of the timing of the transmitted pulse light and the phase of the timing of the photocurrent output from the APD 8, and then the processing in FIG. 8 ends. In step S40, to which the operation proceeds if the distance measurement apparatus is not set in the prism mode, the control circuit 51 implements a conventional non-prism mode measurement processing before ending the processing in FIG. 8.

Advantages similar to those realized in the first embodiment are achieved in the second embodiment described above.

Third Embodiment

Figure 9:
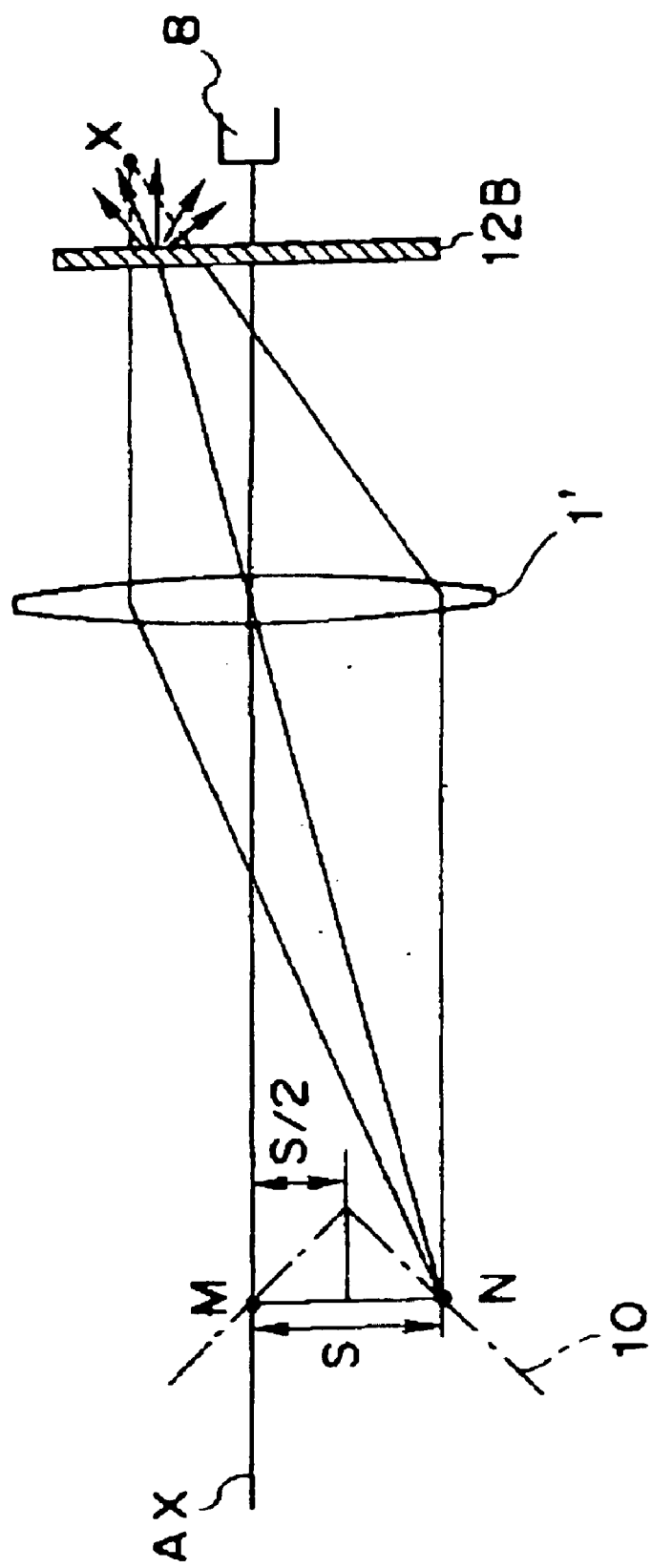
FIG. 9 illustrates the light-receiving optical system in the focusing type distance measurement apparatus achieved in a third embodiment.

The third embodiment is characterized in that when the corner cube 10 is used as the target object, a deflecting plate is inserted between the objective lens 1 and the APD 8 to allow the reflected light flux to enter the APD 8 with ease. FIG. 9 illustrates the light-receiving optical system in the focusing type distance measurement apparatus achieved in the third embodiment of the present invention. FIG. 9 does not include the illustration of the focusing lens, the splitting prism, the dichroic prism, the collimating optical system (the focusing plate and the eyepiece lens) and the like. It differs from the light-receiving optical system in the first embodiment in that no deflecting plate 12 is provided between the LD 7 which emits the measurement light and the objective lens 1 and in that a deflecting plate 12B which achieves a diffusing function is provided between the objective lens 1' and the APD 8.

FIG. 9 shows that the center of the corner cube 10 is offset by a distance S/2 relative to the optical axis AX due to a vibration of the corner cube or the like. When the measurement light flux enters the corner cube at a position M distanced from the center of the corner cube 10 by S/2, the reflected light exits from a position N which is symmetrical to the point of entry of the measurement light flux relative to the center of the corner cube. This would result in the reflected light passing through the objective lens 1' as a light flux originating from a position distanced from the collimation position of the focusing type distance measurement apparatus, i.e., from the optical axis AX, by S and forming an image at a position X distanced from the optical axis AX by Y.

However, since the deflecting plate 12B is provided, the reflected light flux exiting the deflecting plate 12B will have been scattered at the deflecting plate 12B and part of the scattered light enters the light-receiving surface of the APD 8.

As explained earlier, the quantity of light received at the APD 8 of the focusing type distance measurement apparatus is significantly affected by factors such as the distance D to the target object, the material constituting the target object and the type of surface treatment that the target object has undergone. Accordingly, a light variable attenuator is provided in the optical path between the objective lens 1' and the APD 8 in order to adjust the quantity of light entering the APD 8 at a constant level. As in the first embodiment, the deflecting plate 12B is pasted onto part of the ND filter constituting the light variable attenuator. As the control circuit 51 outputs a pulse signal for rotating the motor M, the motor M starts to rotationally drive the round ND filter and, as a result, a portion of the ND filter with the desired concentration or the deflecting plate 12B at the ND filter becomes inserted at the light path.

A decision as to whether or not the deflecting plate 12B should be inserted at the light path should be made as in the decision-making processing executed in the first and second embodiments to decide whether or not the deflecting plate 12 is to be inserted.

In the third embodiment described above, instead of inserting the deflecting plate 12 between the LD 7, which emits the measurement light, and the objective lens 1, the deflecting plate 12B is inserted between the objective lens 1' and the APD 8. Thus, the reflected light flux having passed through the objective lens 1' becomes scattered to allow some of the reflected light flux offset from the optical axis AX to be received at the APD 8. This feature is particularly advantageous when the distance D between the objective lens 1 and the corner cube 10 is small and there is a vibration in the corner cube 10.

Figure 10:
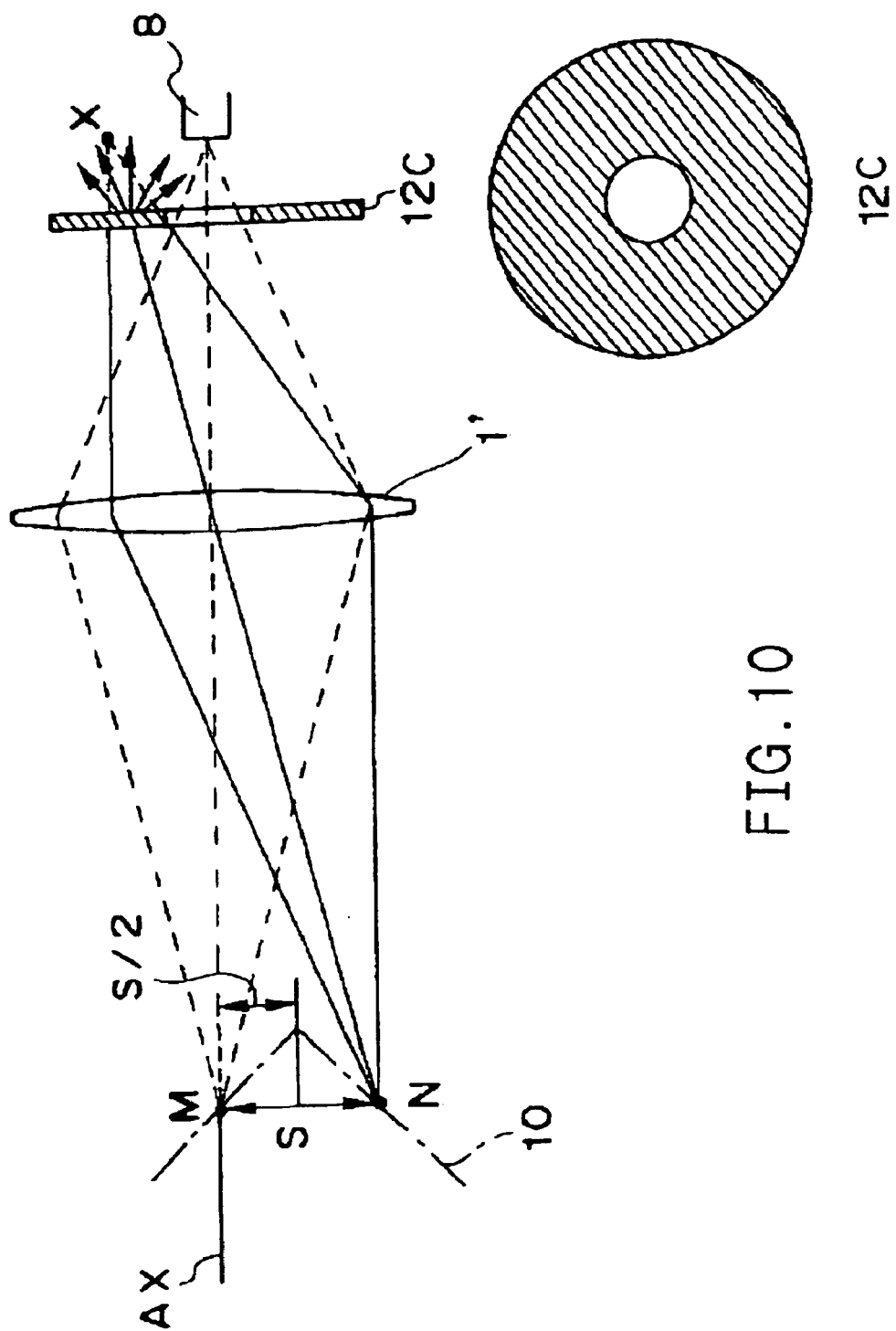
FIG. 10 shows an arrangement in which the deflecting plate is permanently secured.

FIG. 10 shows a deflecting plate 12C provided at a permanently fixed position. It is desirable to ensure that this deflecting plate does not block the light path on the optical axis AX through which the received light flux attributable to the scattered light passes in the non-prism mode. Accordingly, the deflecting plate 12C assumes a shape achieved by concentrically cutting out a part thereof around the optical axis AX so as to ensure that it does not block the light path of the scattered light indicated with the dotted line in FIG. 10. Since this deflecting plate 12C does not further attenuate the scattered light during a non-prism mode measurement, the quantity of the scattered light, which is much less than the quantity of reflected light from a corner cube to begin with, does not become reduced. It is to be noted that a focusing type distance measurement apparatus adopting this structure includes another ND filter which adjusts the quantity of the received light.

Figure 11:
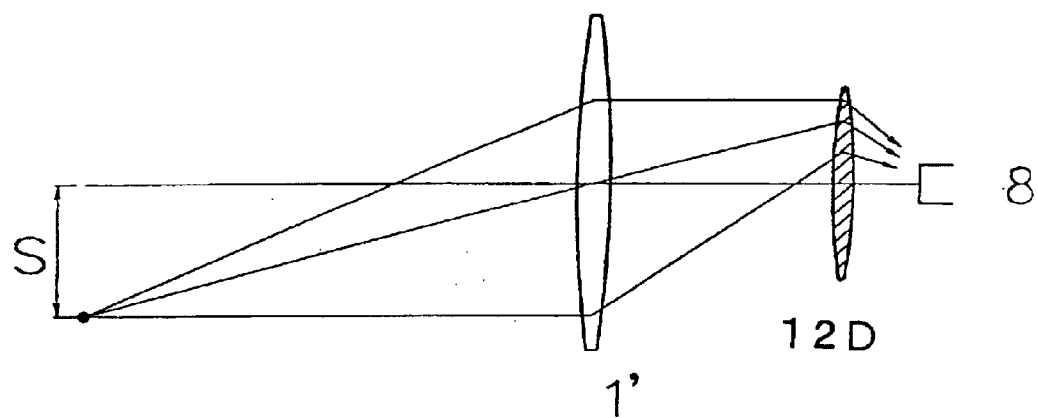
FIG. 11 presents an example of a variation of the light-receiving optical system.

Instead of the deflecting plate 12B shown in FIG. 9, a deflecting plate achieving a refracting function may be utilized. FIG. 11 presents an example of a variation of the light-receiving optical system achieved in the third embodiment. FIG. 11 does not include the illustration of the focusing lens, the splitting prism, the dichroic prism, the collimating optical system (the focusing plate and the eyepiece lens) and the like. A deflecting plate 12D constituted of a convex lens having a refracting function is provided between the objective lens 1' and the APD 8. The reflected light flux exiting the deflecting plate 12D advances toward the light-receiving surface of the APD 8. Namely, the reflected light flux can be received at the APD 8 when a convex lens is used as well.

Figure 12:
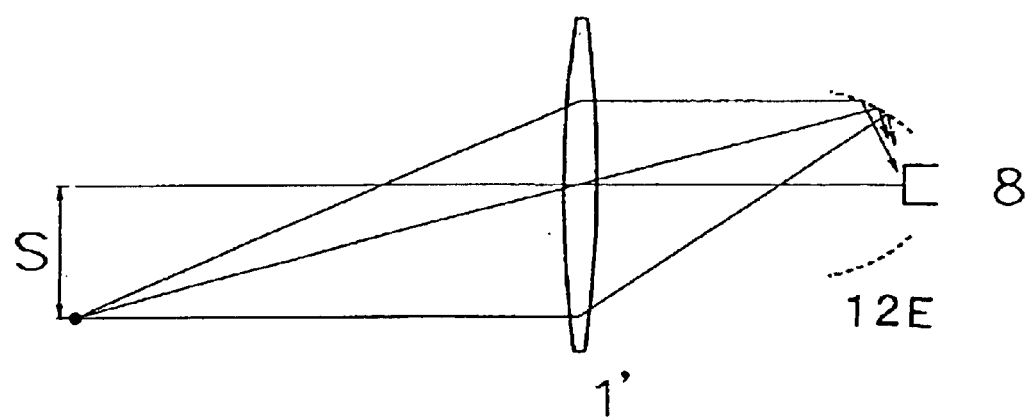
FIG. 12 presents yet another example of the light-receiving optical system.

Alternatively, a deflecting plate having a free-form surface may be utilized. In FIG. 12, a deflecting plate 12E having a reflecting function is provided between the objective lens 1' and the APD 8. The reflected light flux exiting the deflecting plate 12E advances toward the light-receiving surface of the APD 8. Namely, the reflected light flux can be received at the APD 8 when a deflecting plate is utilized as well.

One of the various types of deflecting plates described above may be utilized alone or different types of deflecting plates may be utilized in combination.

Any of the deflecting plates described above is inserted further toward the LD 7 or the APD 8 rather than toward the dichroic prism 3 in FIG. 1. Thus, the deflecting plate inserted in the light-transmitting optical system or the light-receiving optical system does not affect the collimating optical system provided to enable an observation of an image formed with visible light in any way whatsoever.

Fourth Embodiment

Figure 13:
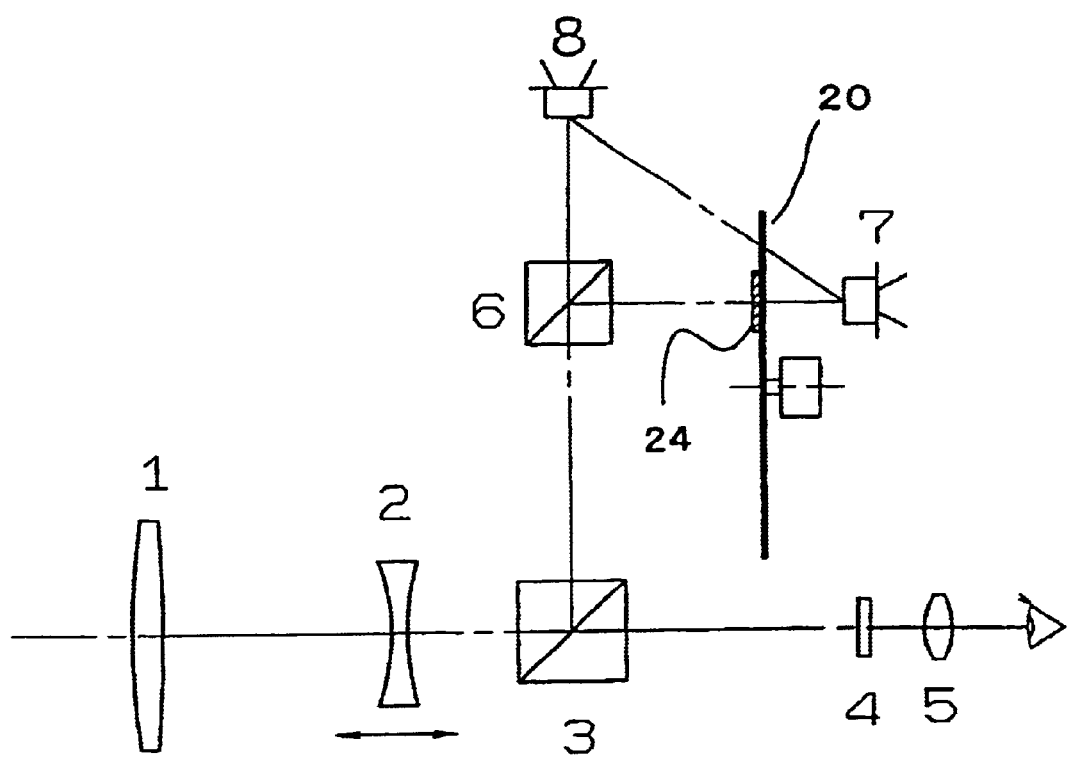
FIG. 13 shows the optical systems in the focusing type distance measurement apparatus achieved in a fourth embodiment.

FIG. 13 shows the basic configuration of the optical systems adopted in the fourth embodiment. This structure includes a switching shutter 20 in addition to the optical systems shown in FIG. 1. The switching shutter 20 selects either an external light path for the pulse light emitted from the LD 7 to be guided through to the target object or an internal light path.

The internal light path in this context refers to a light path provided to cancel out any measurement error attributable to changes in the characteristics of the devices such as the light-receiving device used in the electronic circuit caused by a temperature change. In a high-precision distance measurement apparatus, the distance from the distance measurement apparatus to the target object is determined by subtracting the distance measured through the internal light path from the distance measured through the external light path.

Figure 14:
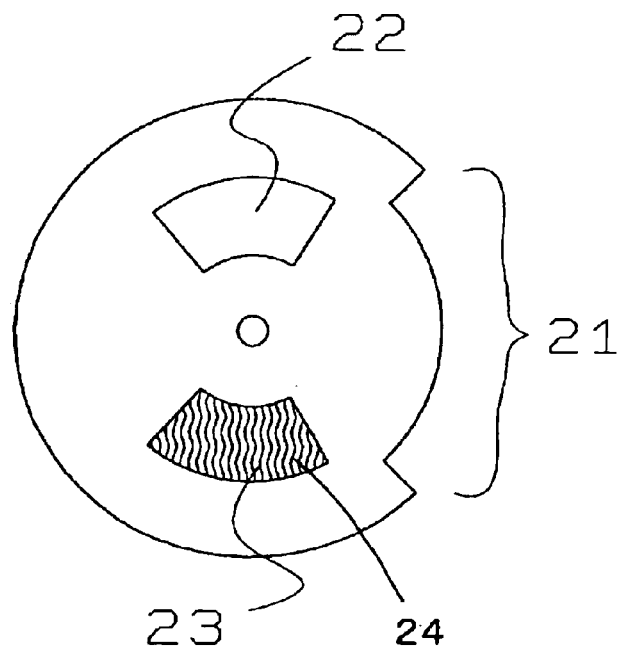
FIG. 14 shows the switching shutter achieved in the fourth embodiment.

In the embodiment, the switching shutter 20 is rotated to switch between the internal light path and the external light path. FIG. 14 presents a front view of the switching shutter 20 (viewed along the optical axis) in the fourth embodiment. The switching shutter 20, which is formed in a substantially round shape, includes an internal path window 21 provided at part of its outer edge. It also includes external path windows 22 and 23 formed by cutting out portions of the shutter in a fan shape. While the external path window 22 is a simple opening, an optical member 24 achieving a diffusing function is provided at the other external light path window 23 and, as a result, the light flux of pulse light passing through the external light path window 23 becomes diffused. A rotating shaft mounted at a motor is provided at the center of the switching shutter 20, and a light path is selected by controlling the rotation of the switching shutter 20 with the motor.

Figure 15:
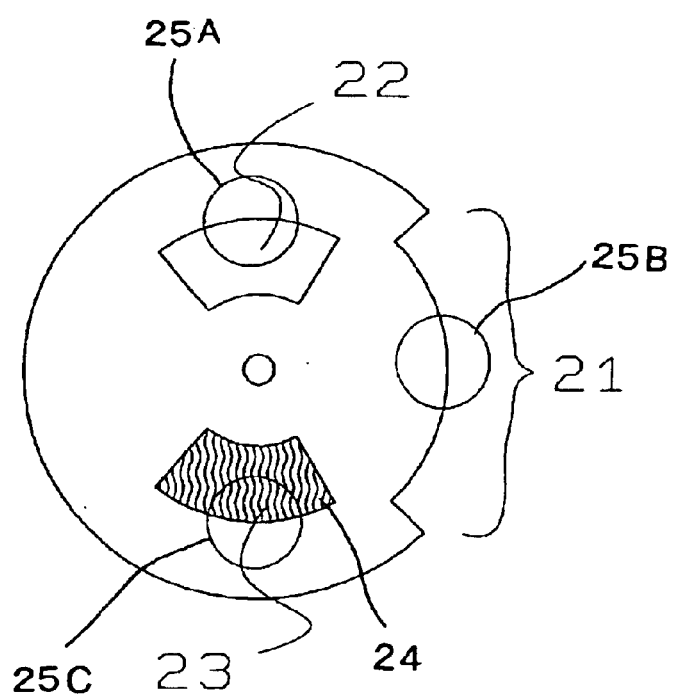
FIG. 15 shows the switching shutter achieved in the fourth embodiment and the positions of the light flux assumed therein.

In the apparatus achieved in the embodiment, the LD 7 is secured at a fixed position and, the switching shutter 20 is rotated without varying the position of the light flux transmitted from the LD 7. However, FIG. 15 shows the switching shutter 20 at a fixed position and the light flux taking on varying positions for purposes of facilitating the explanation.

When the measurement light flux is to be irradiated on the target object which is not a corner cube, the switching shutter 20 is controlled so as to set the light flux at a position 25A. The half of the light flux 25A that is further toward the inside of the switching shutter 20 passes through the external light path window 22 and advances toward the splitting prism 6. It is then reflected inside the dichroic prism 3 and is radiated toward the target object 9 via the focusing lens 2 and the objective lens 1. The measurement light flux having passed the external light path window 22 becomes condensed at the target object 9.

When a measurement is executed through the internal light path, the switching shutter 20 is controlled so as to set the light flux at a position 25B. The half of the light flux 25B that is further toward the inside of the switching shutter 20 becomes blocked by the switching shutter 20, and thus, the outer half of the light flux 25B passes through the internal light path window 21, passes through the ND filter (not shown) and is reflected by an internal light path prism (not shown) before it is finally received at the APD 8. An explanation of a measuring optical system for measuring the internal light path length, which is of the known art, is omitted.

When measuring a distance by using a corner cube as the target object, the switching shutter 20 is controlled so as to set the light flux at a position 25C. The half of the light flux 25C that is further toward the outside of the switching shutter 20 becomes blocked by the switching shutter 20 while the other half is allowed to pass through the external light path window 23. Since the diffusing member 24 similar to the diffusing plate 12 explained earlier is provided at the external light path window 23, the light flux emitted from the LD 7 becomes diffused. The diffused measurement light flux then advances to the splitting prism 6, becomes reflected within the dichroic prism 3 and is then radiated toward the target object 9 via the focusing lens 2 and the objective lens 1.

The distance measurement is performed while collimating and checking the target object through the collimating optical system. For this reason, the position of the focusing lens 2 is adjusted so as to allow light passing through the collimating optical system to be focused on the target object. However, due to the presence of the diffusing member 24, the focusing lens 2 and the collimating optical system no longer have a conjugate relationship to each other and, as a result, even though the collimating optical system is in a focusing state in which light is focused on the corner cube 10, the measurement light flux is defocused and is not condensed on the corner cube 10. Since the measurement light flux is not condensed on the corner cube 10 and thus the measurement light flux is irradiated over a greater area, the reflected light from the corner cube 10 can be received at the APD 8 even if the center of the measurement light flux becomes offset from the center of the corner cube 10 due to a vibration at the corner cube 10 or the like. Thus, advantages similar to those realized in the first~third embodiments are achieved through the distance measurement apparatus in the fourth embodiment.

While a diffusing member is provided at the switching shutter in the fourth embodiment as a deflecting optical member for changing the state in which the light is condensed, a member having a refracting function may be instead provided at the switching shutter. In addition, instead of rotating the round switching shutter to switch from one light path to another, the light paths may be switched by inserting/withdrawing the shutter.

In the fourth embodiment, an additional window is formed at the switching shutter of the related art, which is provided to switch between the internal light path and the external light path, and a deflecting optical member is provided at the window. Thus, the desired advantages are achieved without having to add a new insertion/withdrawal mechanism.

Furthermore, the control of the switching shutter, i.e., the control of the insertion of the deflecting optical member at the light-transmitting optical system, may be achieved through the method explained earlier in reference to the first and second embodiments.

While an explanation is given above on an example in which the present invention is adopted in a distance measurement performed by using pulse light, the present invention may be adopted in conjunction with other distance measurement methods as well. For instance, the present invention may be adopted in a distance measurement performed by using the difference between phases of modulated light.

What is claimed is:

1. A focusing type distance measurement apparatus comprising:
   a collimating optical system that collimates the light from a target object;
   a light-transmitting optical system that includes an objective lens, a dichroic prism, a splitting prism and a laser diode, and that transmits a measurement light flux to the target object;
   a focusing optical system that includes a focusing lens and that condenses the measurement light flux onto the target object;
   a light-receiving optical system that receives a reflected light flux reflected from the target object via the focusing optical system;
   a deflecting optical member that changes a state in which the measurement light flux is condensed on the target object;
   an operating member that outputs an operation signal for performing distance measurement by using a prism as the target object; and
   a control circuit that implements control on the deflecting optical member to achieve a first state for the deflecting optical member so as to change the state in which the measurement light flux received at the light-receiving optical system is condensed when the following conditions are present: the operation signal has been output through the operating member and a light reception level indicating a quantity of the reflected light flux received at the light-receiving optical system is equal to or lower than a predetermined value or the light reception level manifests a significant change, and that implements control on the deflecting optical member to achieve a second state so as not to change the state in which the measurement light flux received at the light-receiving optical system is condensed when the conditions are not present, wherein:
      the deflecting optical member includes a plurality of light transmittance adjustment areas provided along a circumference of a rotating plate and a diffusion area where the light flux is diffused provided along a direction in which the plurality of light transmittance adjustment areas are arranged;
      the control circuit includes a motor in order to rotate the rotating plate; and
      the diffusion area is inserted at a measurement light path when the deflecting optical member is in the first state and one of the plurality of light transmittance adjustment areas is inserted in the measurement light path when the deflecting optical member is in the second state.

2. A focusing type distance measurement apparatus comprising:
   a collimating optical system that collimates the light from a target object;
   a light-transmitting optical system that includes an objective lens, a dichroic prism, a splitting prism and a laser diode, and that transmits a measurement light flux to the target object;
   a focusing optical system that includes a focusing lens and that condenses the measurement light flux onto the target object;
   a light-receiving optical system that receives a reflected light flux reflected from the target object via the focusing optical system;
   a deflecting optical member that changes a state in which the measurement light flux is condensed on the target object;
   an operating member that outputs an operation signal for performing a short distance measurement by using a prism as the target object; and
   a control circuit that implements control on the deflecting optical member to achieve a first state so as to change the state in which the measurement light flux received at the light-receiving optical system is condensed when the operation signal has been output through the operating member and implements control on the deflecting optical member to achieve a second state so as not to change the state in which the measurement light flux received at the light-receiving optical system is condensed when the operation signal has not been output, wherein:
      the deflecting optical member includes a plurality of light transmittance adjustment areas provided along a circumference of a rotating plate and a diffusion area where the light flux is diffused provided along a direction in which the plurality of light transmittance adjustment areas are arranged;
      the control circuit includes a motor in order to rotate the rotating plate; and
      the diffusion area is inserted at a measurement light path when the deflecting optical member is in the first state and one of the plurality of light transmittance adjustment areas is inserted in the measurement light path when the deflecting optical member is in the second state.

3. A focusing type distance measurement apparatus comprising:
   a collimating optical system that collimates the light from a target object;
   a light-transmitting optical system that includes an objective lens, a dichroic prism, a splitting prism and a laser diode, and that transmits a measurement light flux to the target object;
   a focusing optical system that includes a focusing lens and that condenses the measurement light flux onto the target object;
   a light-receiving optical system that receives a reflected light flux reflected from the target object by condensing the reflected light flux via the focusing optical system;

a deflecting optical member that changes a state in which the measurement light flux received at the light-receiving optical system is condensed; and a control circuit that implements control on the deflecting optical member to achieve a first state for the deflecting optical member so as to change the state in which the reflected light flux is condensed when the following condition is present: a light reception level indicating a quantity of the reflected light flux received at the light-receiving optical system is equal to or lower than a predetermined value or the light reception level manifests a significant change, and that implements control on the deflecting optical member to achieve a second state so as not to change the state in which the reflected light flux is condensed when the condition is not present, wherein:

the deflecting optical member includes a plurality of light transmittance adjustment areas provided along a circumference of a rotating plate and a diffusion area where the light flux is diffused provided along a direction in which the plurality of light transmittance adjustment areas are arranged;

the control circuit includes a motor in order to rotate the rotating plate; and the diffusion area is inserted at a measurement light path when the deflecting optical member is in the first state and one of the plurality of light transmittance adjustment areas is inserted in the measurement light path when the deflecting optical member is in the second state.

4. A focusing type distance measurement apparatus comprising:

a collimating optical system that collimates the light from a target object;

a light-transmitting optical system that includes an objective lens, a dichroic prism, a splitting prism and a laser diode, and that transmits a measurement light flux to the target object;

a focusing optical system that includes a focusing lens and that condenses the measurement light flux onto the target object;

a light-receiving optical system that receives a reflected light flux reflected from the target object by condensing the reflected light flux via the focusing optical system;

a deflecting optical member that changes the state in which the measurement light flux received at the light-receiving optical system is condensed;

an operating member that outputs an operation signal for performing a short distance measurement by using a prism as the target object; and a control circuit that implements control on the deflecting optical member to achieve a first state for the deflecting optical member so as to change the state in which the reflected light flux is condensed when the operation signal has been output through the operating member and implements control on the deflecting optical member to achieve a second state so as not to change the state in which the reflected light flux is condensed when the operation signal has not been output, wherein:

the deflecting optical member includes a plurality of light transmittance adjustment areas provided along a circumference of a rotating plate and a diffusion area where the light flux is diffused provided along a direction in which the plurality of light transmittance adjustment areas are arranged;

the control circuit includes a motor in order to rotate the rotating plate; and the diffusion area is positioned in a measurement light path when the deflecting optical member is in the first state and one of the plurality of light transmittance adjustment areas is inserted in the measurement light path when the deflecting optical member is in the second state.

* * * * *